(12) United States Patent
Hasegawa et al.

(10) Patent No.: US 10,676,026 B2
(45) Date of Patent: Jun. 9, 2020

(54) IMAGE SIGNAL PROCESSING APPARATUS AND IMAGE SIGNAL PROCESSING PROGRAM PRODUCT

(71) Applicant: DENSO CORPORATION, Kariya, Aichi-pref. (JP)

(72) Inventors: Takaomi Hasegawa, Kariya (JP); Takashi Hashizume, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 81 days.

(21) Appl. No.: 15/501,220

(22) PCT Filed: Jul. 24, 2015

(86) PCT No.: PCT/JP2015/003712
§ 371 (c)(1),
(2) Date: Feb. 2, 2017

(87) PCT Pub. No.: WO2016/021134
PCT Pub. Date: Feb. 11, 2016

(65) Prior Publication Data
US 2017/0225620 A1      Aug. 10, 2017

(30) Foreign Application Priority Data
Aug. 5, 2014   (JP) ................................ 2014-159450

(51) Int. Cl.
*H04N 5/445* (2011.01)
*B60R 1/00* (2006.01)
(Continued)

(52) U.S. Cl.
CPC ................ *B60R 1/00* (2013.01); *G09G 5/14* (2013.01); *G09G 5/363* (2013.01); *G09G 5/377* (2013.01);
(Continued)

(58) Field of Classification Search
CPC ........... H04N 5/23292; H04N 5/44504; H04N 7/183; B60R 1/00
See application file for complete search history.

(56) References Cited

U.S. PATENT DOCUMENTS

| | | | |
|---|---|---|---|
| 2010/0239024 A1* | 9/2010 | Chikamura | ............ H04N 19/52 375/240.23 |
| 2012/0154591 A1* | 6/2012 | Baur | ........................ B60R 1/00 348/148 |
| 2014/0223158 A1* | 8/2014 | Zhou | ..................... G06F 9/4405 713/2 |

FOREIGN PATENT DOCUMENTS

| | | |
|---|---|---|
| JP | 2009175904 A | 8/2009 |
| JP | 2009284023 A | 12/2009 |
| WO | WO-2016021133 A1 | 2/2016 |

OTHER PUBLICATIONS

U.S. Appl. No. 15/501,211, filed Feb. 2, 2017, Hasegawa et al.

* cited by examiner

*Primary Examiner* — Jonathan R Messmore
(74) *Attorney, Agent, or Firm* — Harness, Dickey & Pierce, P.L.C.

(57) ABSTRACT

An image signal processing apparatus includes a first control unit starting activation in response to an activation request, a decoding unit, and a second control unit. Each of the decoding unit and the second control unit starts activation when the first control unit completes the activation, and shifts from an off-state to a normal operating state after the activation is completed. In the normal operating state, the decoding unit receives an image signal from outside and outputs the image signal after executing a decoding process to the image signal. In the normal operating state, the second control unit processes an image included in the image signal outputted from the decoding unit, and displays the processed image. When the first control unit completes the activation (Continued)

and the decoding unit completes the activation, the first control unit instructs the decoding unit to perform a setting for executing the decoding process.

11 Claims, 6 Drawing Sheets

(51) Int. Cl.
*G09G 5/397* (2006.01)
*G09G 5/377* (2006.01)
*G09G 5/38* (2006.01)
*G09G 5/36* (2006.01)
*G09G 5/14* (2006.01)
*H04N 7/18* (2006.01)
*H04N 5/232* (2006.01)

(52) U.S. Cl.
CPC ............... *G09G 5/38* (2013.01); *G09G 5/397* (2013.01); *H04N 5/23293* (2013.01); *H04N 5/44504* (2013.01); *H04N 7/181* (2013.01); *H04N 7/183* (2013.01); *B60R 2300/207* (2013.01); *B60R 2300/8086* (2013.01); *G09G 2340/0464* (2013.01); *G09G 2340/125* (2013.01); *G09G 2370/12* (2013.01)

IMAGE SIGNAL PROCESSING APPARATUS AND IMAGE SIGNAL PROCESSING PROGRAM PRODUCT

CROSS REFERENCE TO RELATED APPLICATIONS

This application is a U.S. National Phase Application under 35 U.S.C. 371 of International Application No. PCT/JP2015/003712 filed on Jul. 24, 2015 and published in Japanese as WO 2016/021134 A1 on Feb. 11, 2016. This application is based on and claims the benefit of priority from Japanese Patent Application No. 2014-159450 filed on Aug. 5, 2014. The entire disclosures of all of the above applications are incorporated herein by reference.

TECHNICAL FIELD

The present disclosure relates to an image signal processing apparatus and an image signal processing program product each of which decodes an image signal inputted from an image capturing unit, processes an image included in the decoded image signal, and displays the processed image on a display unit.

BACKGROUND ART

Up to now, a vehicle image signal processing apparatus that displays a vehicle surrounding image, which is acquired by an imaging device, on a display device is provided. In this case, when an image signal including, for example, a video indicating rear side of a vehicle which is a blind spot of a driver is input from the imaging device, the input image signal is decoded. The video included in the decoded image signal is processed, and the video that has been processed (processed video) is displayed on the display device. In the video processing, guide lines (for example, vehicle width extension lines, etc.), button keys, and so on are drawn for on-screen display in order to display the on-screen drawn video. In recent years, a first control unit and a second control unit are provided for the purpose of dispersing a processing load. In this configuration, when an accessory (ACC) power supply is switched from off to on, the first control unit starts activation firstly, and the second control unit starts activation after the first control unit completes the activation.

In a configuration where the first control unit and the second control unit are provided and the image processing is performed by the second control unit, the processed image cannot be displayed immediately after the accessory power supply is switched from off to on. Regarding this matter, Patent Literature 1 discloses a configuration in which when the accessory power supply is switched from off to on, unprocessed image (raw image) is displayed until the second control unit completes the activation, and the second control unit controls the processed image (image that has been processed) to be displayed after the second control unit completes the activation.

Incidentally, in a decoding unit for decoding the image signal, a setting needs to be carried out for performing the decoding process. In a configuration where the second control unit performs the setting of the decoding unit, the second control unit starts the setting of the decoding unit after the second control unit completes the activation. This leads to such a problem that, during a period before the setting of the decoding unit is completed, even if the second control unit completes the activation, the processed image cannot be displayed and a raw image is forced to be displayed until the setting of the decoding unit is completed.

PRIOR ART LITERATURE

Patent Literature

[Patent Literature 1] JP 2009-284023 A

SUMMARY OF INVENTION

The present disclosure has been made in view of the above difficulties, and it is an object of the present disclosure to provide an image signal processing apparatus and an image signal processing program product each of which is capable of rapidly displaying a processed image after an activation request of the apparatus is generated.

According to a first aspect of the present disclosure, an image signal processing apparatus includes a first control unit starting an activation in response to an activation request, a decoding unit, and a second control unit. The decoding unit starts an activation when the first control unit completes the activation, and shifts from an off-state to a normal operating state after the activation is completed. In the normal operating state, the decoding unit receives an image signal from an image capturing unit and outputs the image signal after executing a decoding process to the image signal. The second control unit starts an activation when the first control unit completes the activation, and shifts from an off-state to a normal operating state after the activation is completed. In the normal operating state, the second control unit processes an image included in the image signal when receiving the image signal from the decoding unit, and controls a display unit to display the image that is processed. When the first control unit completes the activation and the decoding unit completes the activation, the first control unit instructs the decoding unit to perform a setting for executing the decoding process.

With the above image signal processing apparatus, the setting of the decoding unit can start at a time immediately after the activation of the first control unit completes and before the activation of the second control unit completes (prior to the activation completion), instead of at a time after the activation of the second control unit completes. As a result, the setting of the decoding unit can be completed before the second control unit completes the activation, and the processed image can be rapidly displayed when the second control unit completes the activation.

According to a second aspect of the present disclosure, an image signal processing program product stored in a computer-readable non-transitory tangible storage medium includes instructions to be executed by the decoding unit included in the image signal processing apparatus according to the first aspect. The instructions includes controlling the first control unit to determine whether the first control unit completes the activation, and controlling the first control unit to instruct the decoding unit to perform a setting for executing the decoding process when determining that the first control unit has completed the activation and the decoding unit has completed the activation.

According to the above program product, after the request for activating the subject device is generated, the processed image can be rapidly displayed.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

Figure 1:
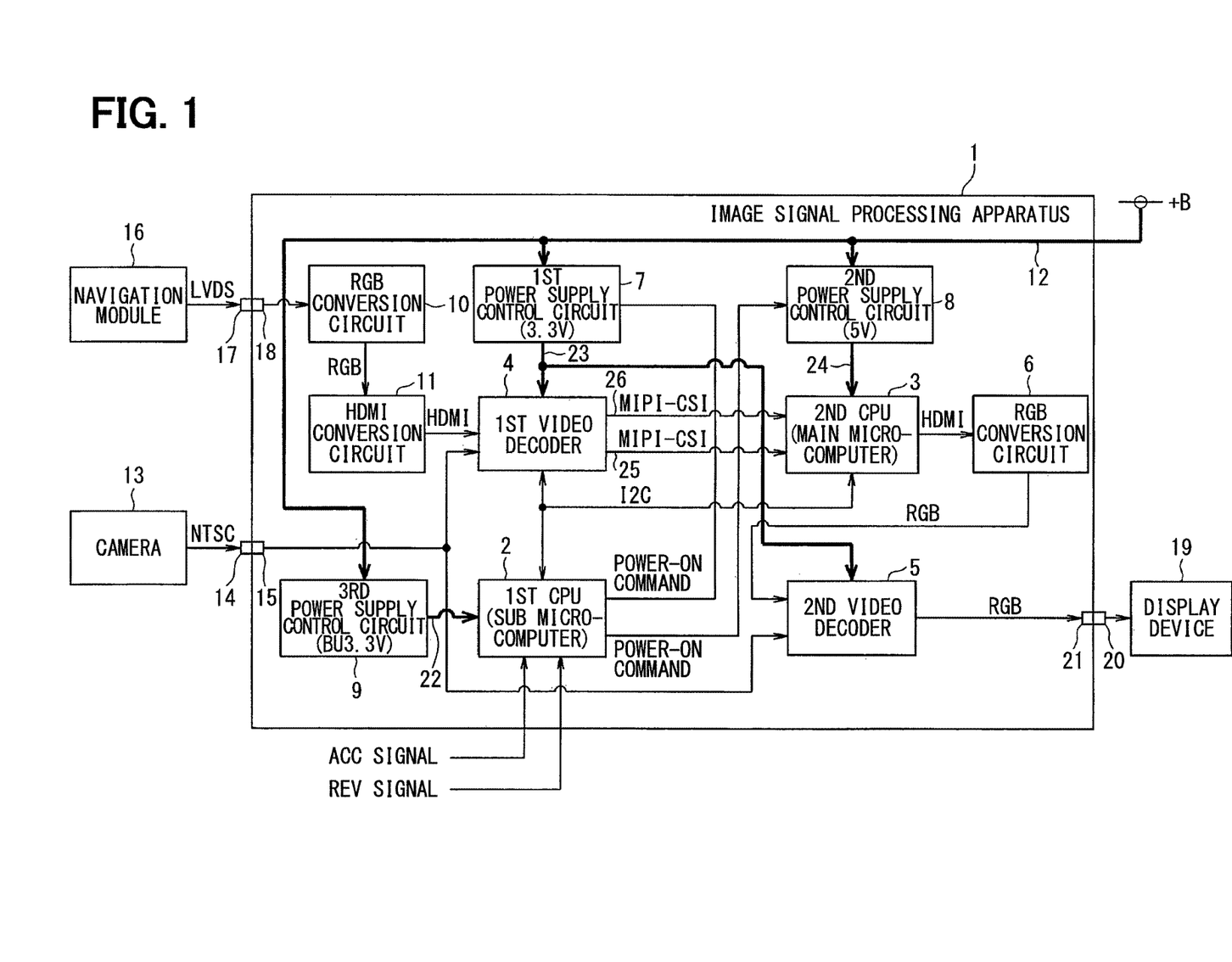
FIG. 1 is a functional block diagram illustrating an embodiment of the present disclosure.

Hereinafter, a vehicle image signal processing apparatus mountable to a vehicle according to an embodiment of the present disclosure will be described with reference to the drawings. An image signal processing apparatus 1 includes a first CPU (central processing unit) 2 (corresponding to a first control unit), a second CPU 3 (corresponding to a second control unit), a first video decoder 4 (corresponding to a decoding unit), a second video decoder 5, an RGB conversion circuit 6, a first power supply control circuit 7, a second power supply control circuit 8, a third power supply control circuit 9, an RGB conversion circuit 10, and an HDMI (registered trademark) (High-Definition Multimedia Interface) conversion circuit 11. The image signal processing apparatus 1 supplies a power, which is supplied from a vehicle battery, to the first power supply control circuit 7, the second power supply control circuit 8, and the third power supply control circuit 9 through a power line 12, and ensures an operating power of the overall device.

The first CPU 2 has specialized characteristics for data processing of a vehicle system to realize a vehicle control, and the second CPU 3 has specialized characteristics for the data processing of an information system such as image data or music data. Data of the information system to be processed by the second CPU 3 is relatively large in data capacity as compared with data of a vehicle system to be processed by the first CPU 2. For that reason, an OS (operating system) and a control program loaded by the second CPU 3 when the second CPU 3 starts activation as will be described later are relatively large in the data capacity as compared with an OS and a control program loaded by the first CPU 2 when the first CPU 2 starts activation.

The image signal processing apparatus 1 can receive an NTSC (national television system committee) signal (image signal) from a camera 13 by connecting a connector 14 of the camera 13 (corresponding to an image capturing unit) with a connector 15 of the image signal processing apparatus 1. The connector 14 of the camera 13 is connected with the camera 13 via a cable. The camera 13 is, for example, a rear camera that is attached to a rear side of the vehicle, captures rear side images of the vehicle, and outputs the NTSC signal including the acquired video to the image signal processing apparatus 1 (first video decoder 4 and second video decoder 5). The rear side of the vehicle is a blind spot to the driver.

In addition, the image signal processing apparatus 1 can receive an LVDS (low voltage differential signaling) signal (image signal) from a navigation module 16 by connecting a connector 17 of the navigation module 16 with a connector 18 of the image signal processing apparatus 1. The connector 17 of the navigation module 16 is connected with the navigation module via a cable. The navigation module 16 generates various screens related to a navigation such as a menu screen, a screen for setting a destination, a screen for route guidance, or a screen for an enlarged view of an intersection, and outputs the LVDS signal including videos of the generated various screens to the image signal processing apparatus 1 (RGB conversion circuit 10). Upon receiving the LVDS signal from the navigation module 16, the RGB conversion circuit 10 converts the received LVDS signal into an RGB signal, and outputs the converted data to the HDMI conversion circuit 11. Upon receiving the RGB signal from the RGB conversion circuit 10, the HDMI conversion circuit 11 converts the received RGB signal into an HDMI signal and outputs the converted data to the first video decoder 4.

In addition, the image signal processing apparatus 1 can output the RGB signal (image signal) to a display device 19 (corresponding to a display unit) by connecting a connector 20 of the display device 19 with a connector 21 of the image signal processing apparatus 1. The connector 20 of the display device 19 is connected with the display device 19 via a cable. The display device 19 is provided by, for example, a liquid crystal display disposed in a vehicle interior and having a predetermined number of pixels (the number of pixels). Upon receiving the RGB signal from the image signal processing apparatus 1, the display device 19 processes the received RGB signal and displays (draws) a video.

The third power supply control circuit 9 generates a backup operating power having a preset operating voltage (3.3 Volts) from the power supplied from the vehicle battery through a power line 12, and supplies the generated operating power to the first CPU 2 through a power line 22.

The first CPU 2 functions as a sub microcomputer in the image signal processing apparatus 1, and the second CPU 3 functions as a main microcomputer in the image signal processing apparatus 1. The first CPU 2 monitors, in a low power consumption operating state, switching of an ACC signal indicative of an on/off state of an accessory (ACC) power supply from OFF to ON. Upon receiving the ACC signal and detecting the switching of the ACC signal from OFF to ON, the first CPU 2 detects the switching (turning on of the accessory power supply by the driver) of the accessory power from OFF to ON. By detecting the switching of the accessory power supply from OFF to ON, the first CPU 2 detects a generation of a request for activating the subject vehicle.

Upon detecting the switching of the accessory power supply from OFF to ON, the first CPU 2 starts a startup process (starts the activation). The first CPU 2 starts a pre-defined activating procedure (loading of an OS and a control program, etc.). When the activating procedure has been normally completed, the first CPU 2 completes the startup process (completes the activation), and shifts from the low power consumption operating state to a normal operating state. Upon shifting to the normal operating state, the first CPU 2 outputs a power-on command to the first power supply control circuit 7, and outputs the power-on command to the second power supply control circuit 8. In this case, the first CPU 2 is designed so as to output the power-on command within, for example, 200 msec after starting the activation.

Figure 2:
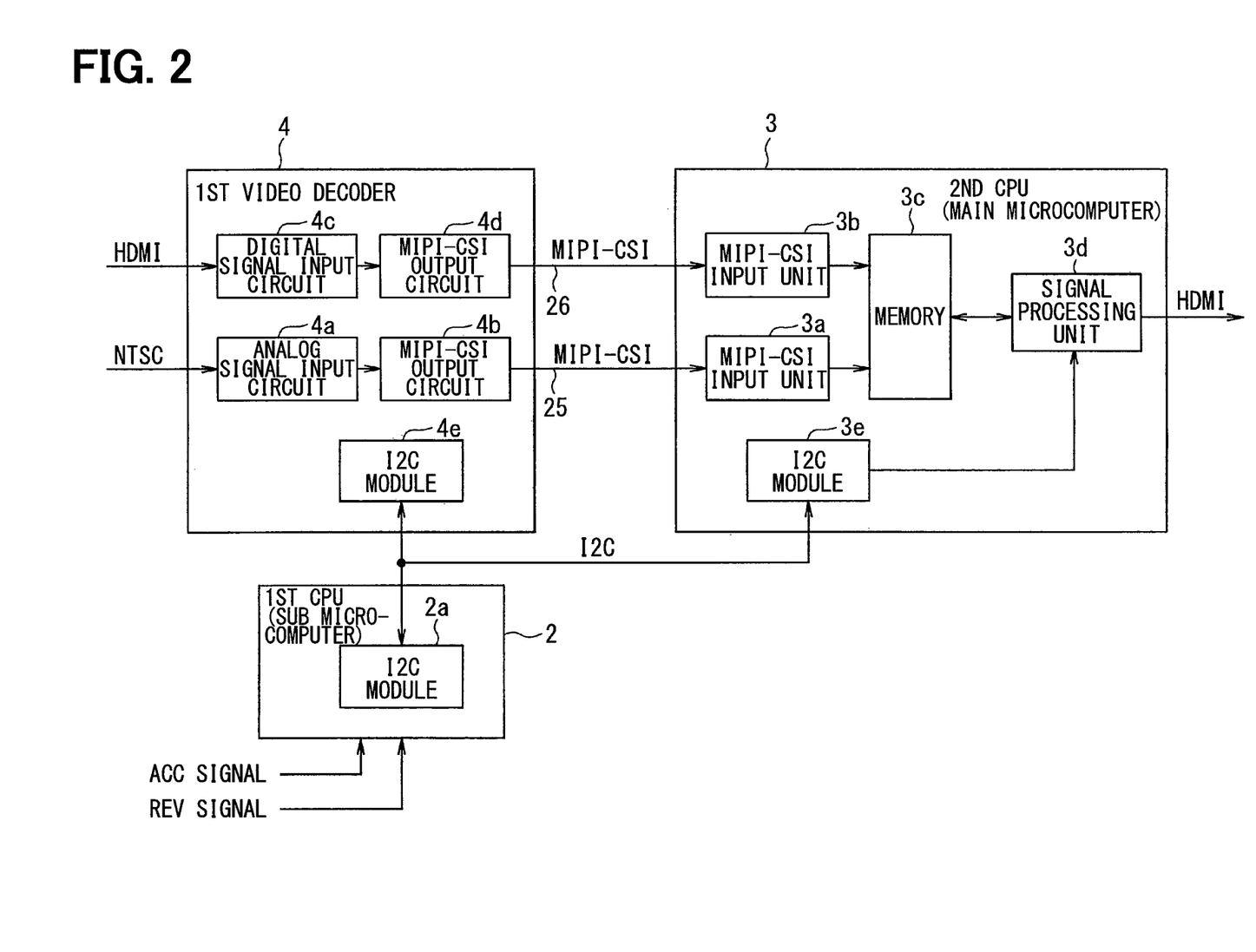
FIG. 2 is a functional block diagram illustrating a configuration of a first CPU, a second CPU, and a first video decoder.

In addition, the first CPU 2 monitors, in the normal operating state, the switching of a reverse (REV) signal indicating whether a shift lever is at a reverse position from OFF to ON. Upon receiving the REV signal and detecting the switching of the REV signal from OFF to ON, the first CPU 2 detects the shift of the shift lever to the reverse position (operation of shifting the shift lever to the reverse position by the driver). In addition, as illustrated in FIG. 2, the first CPU 2 includes an I2C (Inter-Integrated Circuit) module 2a. The first CPU 2 performs a data communication with the second CPU 3 or the first video decoder 4 by controlling the I2C module 2a to perform a data communication control.

The first power supply control circuit 7 generates an operating power having a preset operating voltage (3.3 Volts) from a power supplied from the vehicle battery through the power line 12. Upon receiving the power-on command from the first CPU 2, the first power supply control circuit 7 generates the operating power and supplies the generated operating power to the first video decoder 4 and the second video decoder 5 through a power line 23.

The second power supply control circuit 8 can generate an operating power having a preset operating voltage (5 Volts) from the power supplied from the vehicle battery through the power line 12. Upon receiving the power-on command from the first CPU 2, the second power supply control circuit 8 generates the operating power and supplies the generated operating power to the second CPU 3 through a power line 24.

Upon receiving the operating power from the first power supply control circuit 7 through the power line 23, the first video decoder 4 shifts from the off-state to the normal operating state. In the normal operating state, upon receiving the NTSC signal from the camera 13, the first video decoder 4 decodes the received NTSC signal and outputs the decoded NTSC signal to the second CPU 3. In addition, in the normal operating state, upon receiving the HDMI signal from the HDMI conversion circuit 11, the first video decoder 4 processes the received HDMI signal and outputs the decoded HDMI signal to the second CPU 3.

More specifically, as illustrated in FIG. 2, the first video decoder 4 includes an analog signal input circuit 4a, an MIPI (Mobile Industry Processor Interface)-CSI (Camera Serial Interface) output circuit 4b, a digital signal input circuit 4c, an MIPI-CSI output circuit 4d, and an I2C module 4e. Upon receiving the NTSC signal from the camera 13, the analog signal input circuit 4a outputs the received NTSC signal to the MIPI-CSI output circuit 4b. Upon receiving the NTSC signal from the analog signal input circuit 4a, the MIPI-CSI output circuit 4b converts the received NTSC signal into a signal of an MIPI-CSI data format and outputs the converted data to the second CPU 3 through a first transmission path 25. Upon receiving the HDMI signal from the HDMI conversion circuit 11, the digital signal input circuit 4c outputs the received HDMI signal to the MIPI-CSI output circuit 4d. Upon receiving the HDMI signal from the digital signal input circuit 4c, the MIPI-CSI output circuit 4d converts the received HDMI signal into a signal of the MIPI-CSI data format, and outputs the converted data to the second CPU 3 through a second transmission path 26. In other words, the first video decoder 4 includes a route for decoding the received NTSC signal received from the camera 13 to output the decoded NTSC signal and a route for decoding the HDMI signal received from the HDMI conversion circuit 11 to output the decoded HDMI signal, and the two routes are independent from one another. In addition, the first video decoder 4 performs a data communication with the first CPU 2 and the second CPU 3 by controlling the I2C module 4e to perform the data communication control.

Upon receiving the operating power from the second power supply control circuit 8 through the power line 24, the second CPU 3 starts the startup process (starts the activation). Upon starting the activation, the second CPU 3 generates and outputs a synchronization signal (clock signal having a predetermined frequency), and starts the predefined activating procedure (loading the OS and the control program, etc.). Upon normal completion of the activating procedure, the second CPU 3 completes the startup process (completes the activation), and shifts from the off-state to the normal operating state. In this case, the second CPU 3 is designed so as to output the synchronization signal within, for example, 1.3 msec after starting the activation. In the normal operating state, upon receiving the signal of the MIPI-CSI data format from the first video decoder 4, the second CPU 3 processes the image included in the received signal and outputs the HDMI signal including the processed image to the RGB conversion circuit 6.

More specifically, as illustrated in FIG. 2, the second CPU 3 includes MIPI-CSI input units 3a, 3b, a memory 3c, a signal processing unit 3d, and an I2C module 3e. Upon receiving a signal of the MIPI-CSI data format from the first video decoder 4 through the first transmission path 25, the MIPI-CSI input unit 3a outputs image data included in the received signal to a first storage area of the memory 3c and stores (writes) the output image data in the first storage area. The first storage area is a circular reference type storage area. Upon receiving the signal of the MIPI-CSI data format from the first video decoder 4 through the second transmission path 26, the MIPI-CSI input unit 3b outputs the image data included in the received signal to a second storage area of the memory 3c, and stores (writes) the output image data in the second storage area. The second storage area is also a circular reference type storage area. In other words, the second CPU 3 includes a route for receiving a signal obtained by decoding the NTSC signal from the camera 13 and a route for receiving a signal obtained by decoding the LVDS signal from the navigation module 16, and the two routes are independent from one another.

During a period where a condition for outputting the image of the camera 13 is satisfied, the signal processing unit 3d reads out the image data stored in the first storage area of the memory 3c, and draws, for on-screen display, guide lines (for example, vehicle width extension lines, etc.), button keys, and the like on the image of the readout image data. The signal processing unit 3d outputs the HDMI signal including the on-screen drawn image to the RGB conversion circuit 6. In this situation, the second CPU 3 outputs the HDMI signal to the RGB conversion circuit 6 in conformity to the synchronization signal. On the other hand, during a period where a condition for outputting the image of the navigation module 16 is satisfied, the signal processing unit 3d reads out the image data stored in the second storage area of the memory 3c, and outputs the HDMI signal including the image of the read image data to the RGB conversion circuit 6. In this situation, the second CPU 3 also outputs the HDMI signal to the RGB conversion circuit 6 in conformity to the synchronization signal. The second CPU 3 performs a data communication with the first CPU 2 or the first video decoder 4 by controlling the I2C module 3e to perform a data communication control.

Upon receiving the HDHI signal from the second CPU 3, the RGB conversion circuit 6 converts the received HDMI signal into the RGB signal and outputs the converted data to the second video decoder 5.

Figure 3:
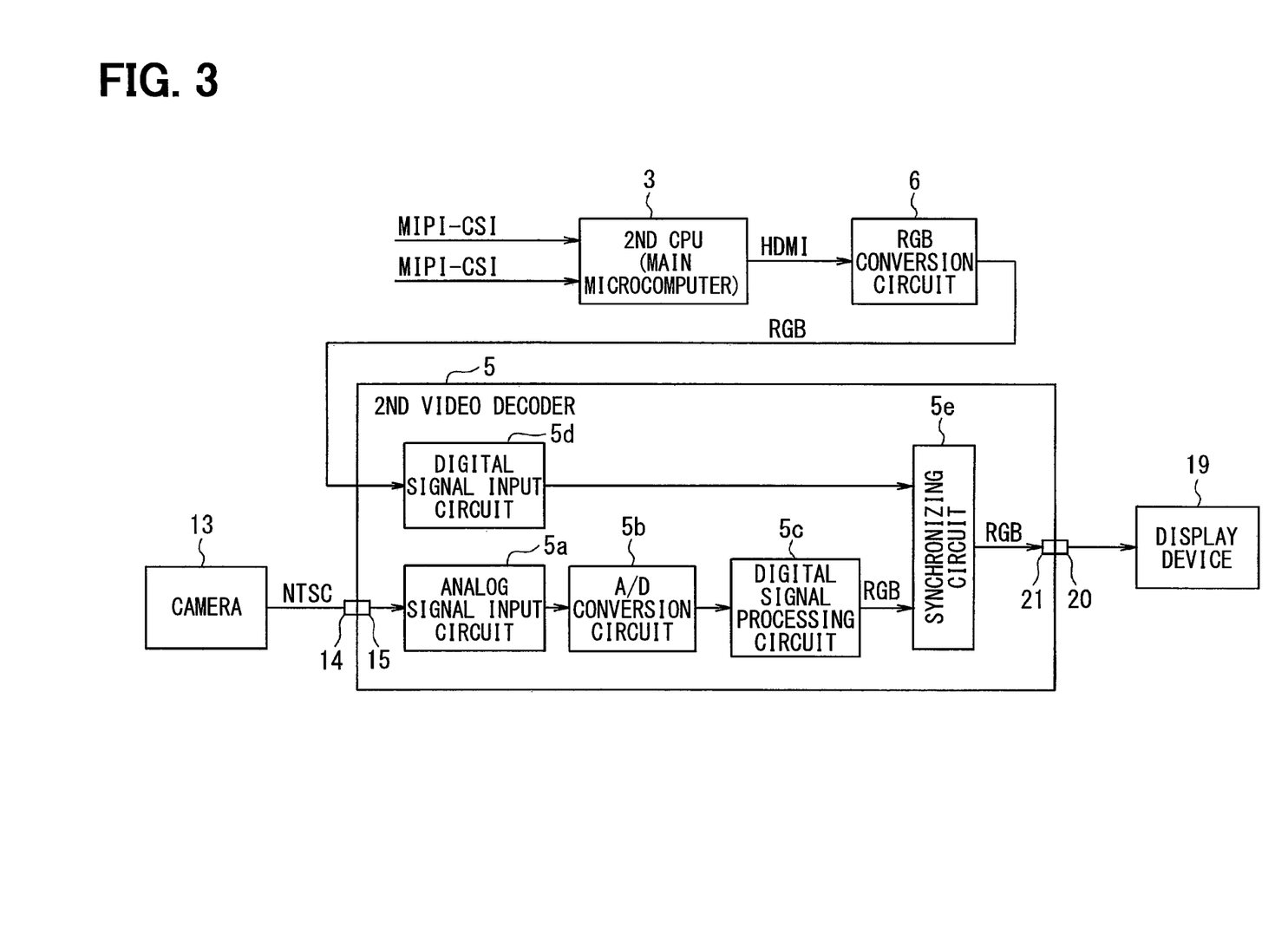
FIG. 3 is a functional block diagram illustrating a configuration of a second video decoder.

Upon receiving the operating power from the first power supply control circuit 7 through the power line 23, the second video decoder 5 shifts from the off-state to the normal operating state. As illustrated in FIG. 3, the second video decoder 5 includes an analog signal input circuit 5a, an analog-digital (A/D) conversion circuit 5b, a digital signal processing circuit 5c, a digital signal input circuit 5d, and a synchronizing circuit 5e. Upon receiving the NTSC signal from the camera 13, the analog signal input circuit 5a outputs the received NTSC signal to the A/D conversion circuit 5b. Upon receiving the NTSC signal from the analog signal input circuit 5a, the A/D conversion circuit 5b converts the received NTSC signal from an analog signal to a digital signal, and outputs the converted digital signal to the digital signal processing circuit 5c. Upon receiving the NTSC signal from the A/D conversion circuit 5b, the digital signal processing circuit 5c converts the received NTSC signal into the RGB signal, and outputs the converted data to the synchronizing circuit 5e. Upon receiving the RGB signal from the digital signal processing circuit 5c, the synchronizing circuit 5e outputs the received RGB signal to the display device 19. That is, when receiving the NTSC signal transmitted from the camera 13 bypassing the first video decoder 4 and the second CPU 3, the synchronizing circuit 5e outputs, to the display device 19, RGB signal which is converted from the NTSC signal of the camera 13.

Upon receiving the RGB signal from the RGB conversion circuit 6, the digital signal input circuit 5d outputs the received RGB signal to the synchronizing circuit 5e. Upon receiving the RGB signal from the digital signal input circuit 5d, that is, upon receiving, through the first image decoder 4 and the second CPU 3, the RGB signal which is converted from the NTSC signal of the camera 13 the synchronizing circuit 5e outputs the received RGB signal to the display device 19.

In the above configuration, the first CPU 2 starts the activation after the accessory power supply switches from OFF to ON, and the second CPU 3 starts the activation after the activation of the first CPU 2 is completed. For that reason, during a period from the accessory power supply is switched from OFF to ON until the second CPU 3 completes the activation, the second CPU 3 cannot perform the image processing. In other words, the RGB signal is not output from the RGB conversion circuit 6 to the second video decoder 5, and the image (processed image) processed by the second CPU 3 cannot be displayed on the display device 19.

Figure 4:
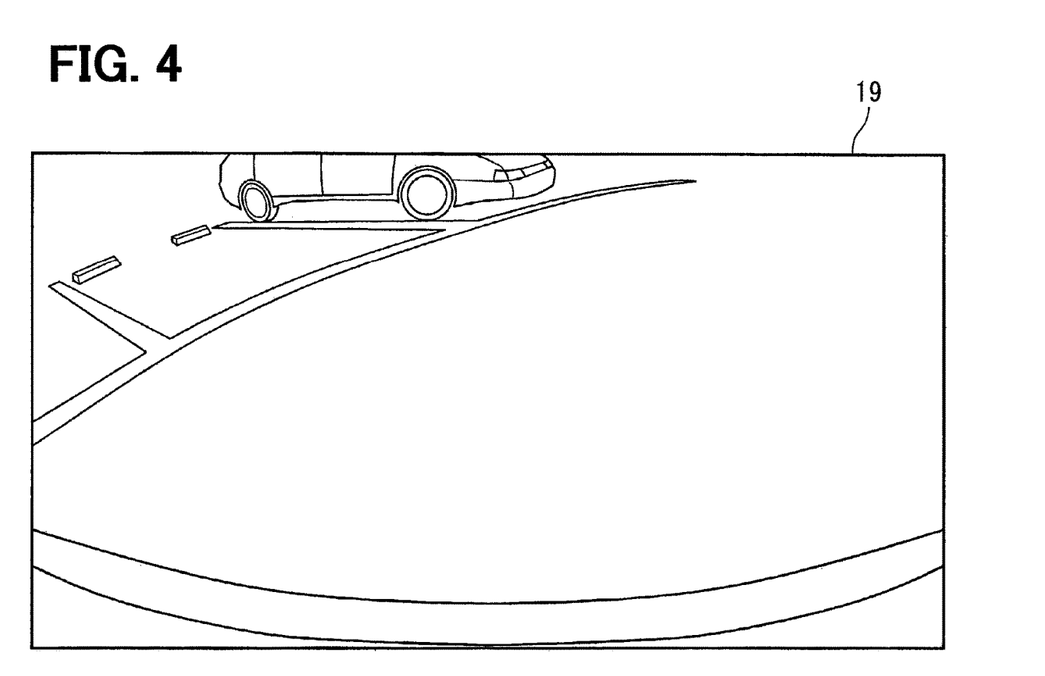
FIG. 4 is a diagram illustrating a raw image to be display on a display device.

With consideration of the above circumstance, in the above configuration, after shifting from the off-state to the normal operating state, during a period before the second video decoder 5 receives the RGB signal from the RGB conversion circuit 6, the second video decoder 5 performs data conversion to the NTSC signal transmitted from the camera 13 bypassing the first video decoder 4 and the second CPU 3, and outputs the data-converted RGB signal to the display device 19. In other words, as illustrated in FIG. 4, the second video decoder 5 displays the image (raw image) which is not processed by the second CPU 3 on the display device 19.

Figure 5:
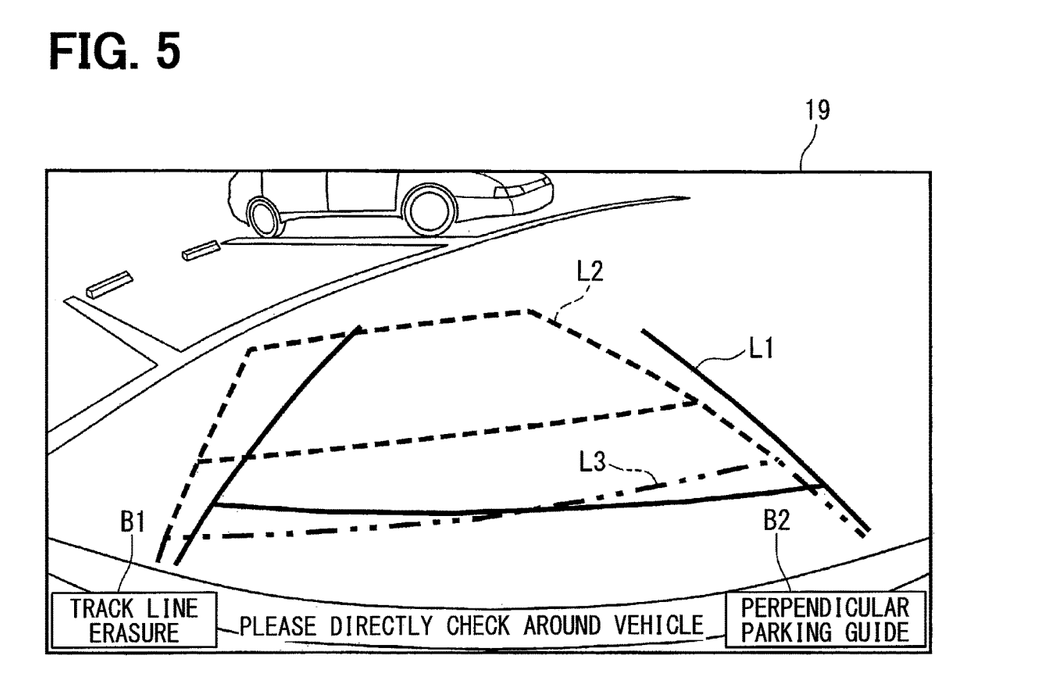
FIG. 5 is a diagram illustrating a processed image to be displayed on the display device.

After the second CPU 3 completes the activation, upon receiving the RGB signal from the RGB conversion circuit 6, the second video decoder 5 outputs the RGB signal transmitted from the camera 13 through the first video decoder 4 and the second CPU 3 to the display device 19. In other words, as illustrated in FIG. 5, the second video decoder 5 displays the image (processed image) processed by the second CPU 3 on the display device 19. FIG. 5 illustrates a configuration in which the guide lines and the button key are on-screen drawn as the image processing, and the on-screen drawn image is displayed. The guide lines include, for example, a vehicle width extension line L1 (indicated by solid lines) indicating a line obtained by extending the vehicle width, a track prediction line L2 (indicated by dashed lines) indicating a line predicting a track at the current steering angle, and a distance reference line L3 (indicated by a two-dot chain line) indicating a distance of about 0.5 m from a rear end of the vehicle. In that case, in the display device 19, the vehicle width extension line L1 is displayed, for example, with green, the track prediction line L2 is displayed, for example, with yellow, and the distance reference line L3 is displayed, for example, with red. Thus, the guide lines are displayed with colors. The button keys include a "track line erasure" button key B1 operable by the user and a "perpendicular parking guide" button key B2.

As described above, during a period after the accessory power supply is switched from OFF to ON and before the second image decoder 5 receives the RGB signal from the RGB conversion circuit 6, the second video decoder 5 displays the unprocessed image (raw image). When the second CPU 3 completes the activation and the second image decoder 5 receives the RGB signal from the RGB conversion circuit 6, the second image decoder 5 displays the image that has been processed (processed image). In other words, the second video decoder 5 switches the RGB signal to be output to the display device 19, and switches the display of the video from the unprocessed video to the processed video.

In the first video decoder 4 that decodes an NTSC signal and an HDMI signal, a setting is required to be carried out for performing the decoding process. In a configuration where the second CPU 3 performs the setting of the first video decoder 4, there is a problem that the processed image cannot be displayed during a period before the setting of the first video decoder 4 is completed even though the second CPU 3 completes the activation. From this viewpoint, the present embodiment provides the following configuration. The first CPU 2, the second CPU 3, and the first video decoder 4 perform a data communication under a data communication control performed by the I2C modules 2a, 3e and 4e, respectively. In this situation, the first CPU 2 and the second CPU 3 function as respective master communication devices, and the first video decoder 4 functions as a slave communication device. In other words, the second CPU 3 is capable of controlling the first video decoder 4, and the first CPU 2 is also capable of controlling the first video decoder 4.

Subsequently, the operation of the above configuration will be described with reference to FIGS. 6 and 7.

Figure 6:
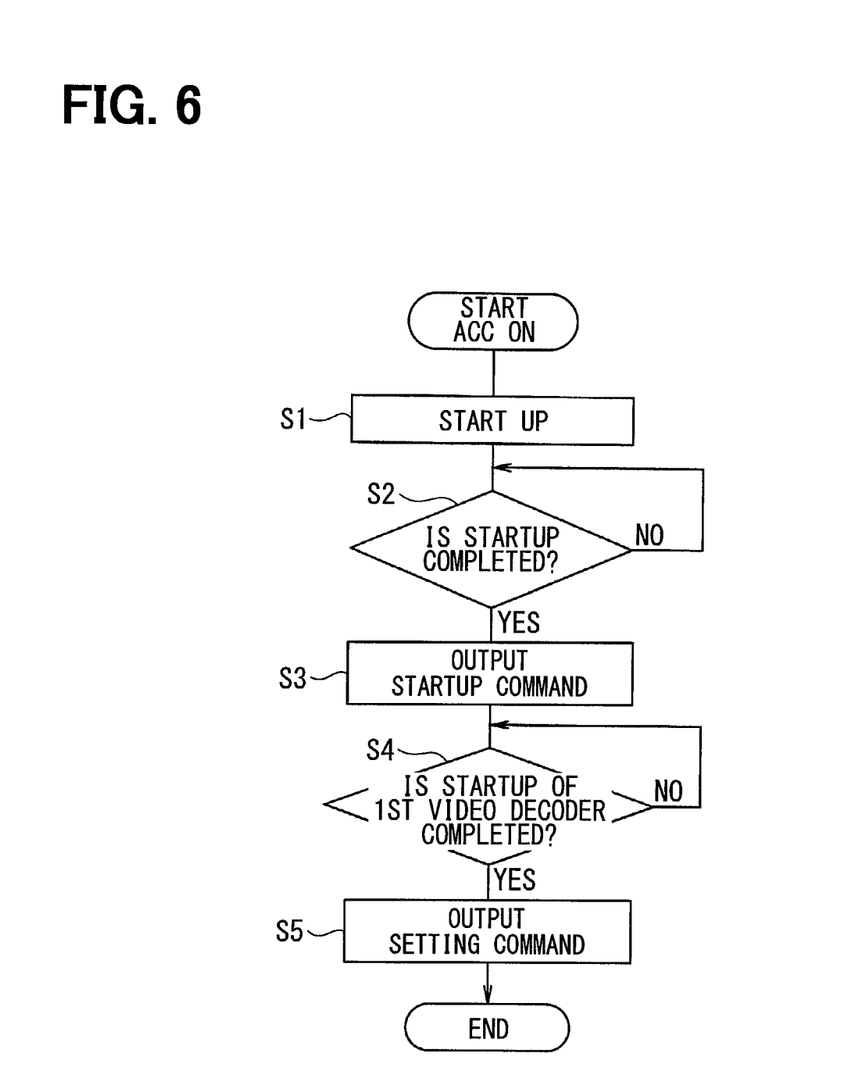
FIG. 6 is a flowchart illustrating a process to be performed by the first CPU.
Figure 7:
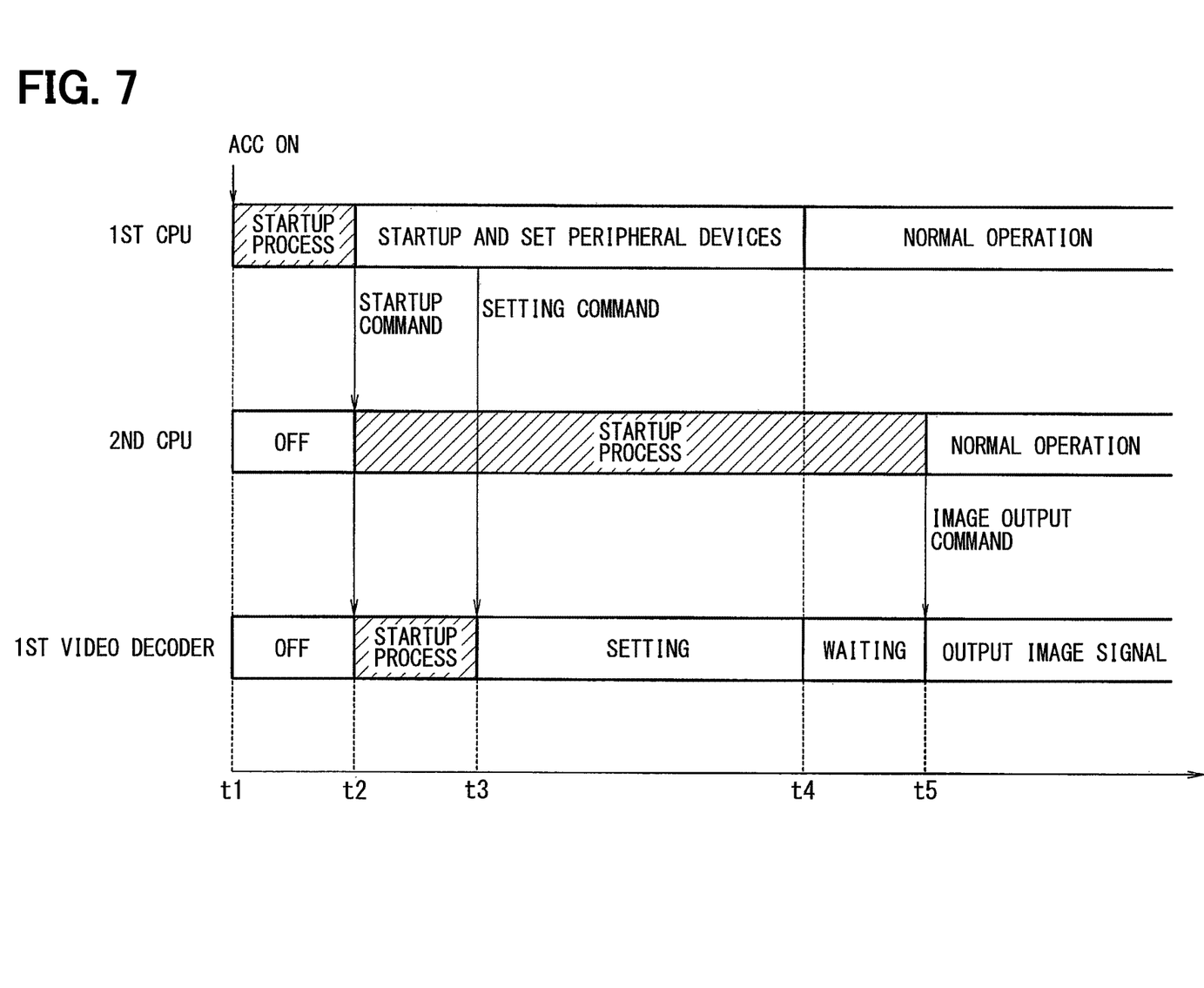
FIG. 7 is a time chart illustrating processes to be performed by the first CPU, the second CPU, and the first video decoder.

According to the present disclosure, the first CPU 2 executes an image signal processing program according to a flowchart shown in FIG. 6. In this example, a case in which the driver turns on the accessory power supply and immediately shifts the shift lever to the reverse position will be described. The image signal processing program may be provided as a program product stored in a computer-readable non-transitory tangible storage medium.

Upon detecting the switching of the ACC signal from OFF to ON, the first CPU 2 starts up (S1, at a time t1 in FIG. 7), and waits for the completion of the activation (S2, first procedure). The first CPU 2 starts a predefined startup procedure, and determines that the activation has been completed when the startup procedure is normally completed (yes in S2), and shifts from the low power consumption operating state to the normal operating state. Upon shifting to the normal operating state, the first CPU 2 outputs a power-on command to the first power supply control circuit 7, and outputs a power-on command to the second power supply control circuit 8. In response to those commands, an operating power from the first power supply control circuit 7 is supplied to the first video decoder 4 and the second video decoder 5 through the power line 23. In addition, the operating power from the second power supply control circuit 8 is supplied to the second CPU 3 through the power line 24.

Then, the first CPU 2 outputs the startup command to the second CPU 3 and the first video decoder 4 (S3, at a time t2 in FIG. 7), and monitors whether the first video decoder 4 completes the activation (S4). When the first video decoder 4 receives the operating power from the first power supply control circuit 7 through the power line 22 and receives the startup command from the first CPU 2, the first video decoder 4 starts the activation. In addition, when the second CPU 3 receives the operating power from the second power supply control circuit 8 through the power line 23 and receives the startup command from the first CPU 2, the second CPU 3 starts the activation. In this situation, since the OS and the control program to be loaded when the second CPU 3 starts the activation is larger in data capacity than the OS and the control program to be loaded when the first CPU 2 starts the activation as described above, a duration (t2 to t5) required for the activation process of the second CPU 3 is longer than a duration (t1 to t2) required for the activation process of the first CPU 2.

When the first CPU 2 determines that the first video decoder 4 completes the activation (S4: YES), the first CPU 2 outputs the setting command to the second CPU 3 (S5, at a time t3 in FIG. 7, second procedure). Upon receiving the setting command from the first CPU 2, the first video decoder 4 starts the setting for performing the decoding process. After completion of the setting process (at a time t4 in FIG. 7), the first video decoder 4 waits for an input of the image output command from the second CPU 3 (at a time t5 in FIG. 7). The second CPU 3 starts the predefined activation procedure, and upon normal completion of the activation procedure, the second CPU 3 completes the activation, and outputs the image output command to the first video decoder 4 (at a time t5 in FIG. 7).

With the above series of processing, the first CPU 2 instructs a setting of the first video decoder 4 before the second CPU 3 completes the activation (prior to the activation completion).

As described above, the present embodiment can obtain advantages described below.

In the image signal processing apparatus 1, the second CPU 3 can control the first video decoder 4 and the first CPU 2 can also control the first video decoder 4. Upon completion of the activation of the first CPU 2, the first CPU 2 instructs a setting to the first video decoder 4. With the above configuration, the setting of the first video decoder 4 has no need to wait until the second CPU 3 completes the activation, but can start after the activation completion of the first CPU 2 and before the second CPU 3 completes the activation (prior to the activation completion). As a result, the setting of the first video decoder 4 can be completed before the second CPU 3 completes the activation, and the processed image can be rapidly displayed when the second CPU 3 completes the activation. In other words, in a configuration where the second CPU 3 instructs the setting of the first video decoder 4, the processed image cannot be displayed during a period before the setting of the first video decoder 4 completes even though the second CPU 3 has completed the activation. On the contrary, when the first CPU 2 instructs the setting of the first video decoder 4, the processed image can be displayed immediately after the second CPU 3 completes the activation.

With the above configuration, since the guide lines and the button keys are on-screen drawn as the image processing with the use of the camera 13 that captures images at a rear side of the vehicle which is a blind spot of the driver, the image in which the guide lines and the button keys are on-screen drawn can be rapidly displayed.

The present disclosure is not limited to the above embodiment, and can be modified or expanded as follows.

The image capturing unit is not limited to the rear camera that captures images of the rear side of the vehicle, but may be provided by a side camera that captures images of a lateral side of the vehicle.

The second control unit is not limited to the process in which the guide lines and the button keys are on-screen drawn as the image processing. Alternatively, only the guide lines may be on-screen drawn, or only the button keys may be on-screen drawn. When the guide lines are on-screen drawn, only one of the vehicle width extension line, the track prediction, or the distance reference line may be on-screen drawn.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

What is claimed is:

1. An image signal processing apparatus comprising:
   a first processor starting a first processor activation in response to an activation request;
   a first video decoder starting a first video decoder activation when the first processor completes the first processor activation and shifting from an off-state to a normal operating state after the first video decoder activation is completed, wherein, in the normal operating state, the first video decoder receives an image signal from a camera and outputs the image signal after executing a decoding process to the image signal;
   a second video decoder; and
   a second processor starting a second processor activation when the first processor completes the first processor activation and shifting from an off-state to a normal operating state after the second processor activation is completed, wherein, in the normal operating state, the second processor processes an image included in the image signal received from the first video decoder, and outputs an image signal including the image that is image processed by the second processor to the second video decoder;
   wherein:
   the second video decoder starts a second video decoder activation when the first processor completes the first processor activation and shifts from an off-state to a normal operating state after the second video decoder activation is completed;

the second video decoder is connected with the first video decoder via the second processor;

in the normal operating state before the second processor completes the second processor activation, the second video decoder receives the image signal transmitted from the camera bypassing the first video decoder and the second processor, executes a decoding process to the image signal, and outputs the image signal that is decoding processed by the second video decoder to the display device to control the display device to display an image that is decoding processed by the second video decoder and is not image processed by the second processor, and in the normal operating state after the second processor completes the second processor activation, the second video decoder receives the image signal from the second processor and controls the display device to display the image that is decoding processed by the first video decoder and is image processed by the second processor;

a time required for the second processor from starting the second processor activation until completing the second processor activation is longer than a time required for the first processor from starting the first processor activation until completing the first processor activation; and when the first processor completes the first processor activation and the first video decoder completes the first video decoder activation, the first processor instructs the first video decoder to perform a setting for executing the decoding process before the second processor completes the second processor activation.

2. The image signal processing apparatus according to claim 1, wherein
the first video decoder receives, from the camera, the image signal including an image acquired by the camera and indicating a rear side of a vehicle.

3. The image signal processing apparatus according to claim 2, wherein
the second processor processes the image by on-screen drawing guide lines and a button key.

4. An image signal processing program product stored in a computer-readable non-transitory tangible storage medium, comprising instructions to be executed by a computer included in an image signal processing apparatus, wherein the image signal processing apparatus includes:
a first processor starting a first processor activation in response to an activation request;
a first video decoder starting a first video decoder activation when the first processor completes the first processor activation and shifting from an off-state to a normal operating state after the first video decoder activation is completed, wherein, in the normal operating state, the first video decoder receives an image signal from a camera and outputs the image signal after executing a decoding process to the image signal;
a second video decoder; and
a second processor starting a second processor activation when the first processor completes the first processor activation and shifting from an off-state to a normal operating state after the second processor activation is completed, wherein, in the normal operating state, the second processor processes an image included in the image signal when receiving the image signal from the first video decoder, and outputs an image signal including the image that is image processed by the second processor to the second video decoder; wherein:

the second video decoder starts a second video decoder activation when the first processor completes the first processor activation and shifts from an off-state to a normal operating state after the second video decoder activation is completed;

the second video decoder is connected with the first video decoder via the second processor, in the normal operating state before the second processor completes the second processor activation, the second video decoder receives the image signal transmitted from the camera bypassing the first video decoder and the second processor, executes a decoding process to the image signal, and outputs the image signal that is decoding processed by the second video decoder to a display device to control the display device to display an image that is decoding processed by the second video decoder and is not image processed by the second processor, and in the normal operating state after the second processor completes the second processor activation, the second video decoder receives the image signal from the second processor and controls the display device to display the image that is decoding processed by the first video decoder and is image processed by the second processor;

a time required for the second processor from starting the second processor activation until completing the second processor activation is longer than a time required for the first processor from starting the first processor activation until completing the first processor activation, and the instructions comprise:
controlling the first processor to determine whether the first processor completes the first processor activation; and
controlling the first processor to instruct the first video decoder to perform a setting for executing the decoding process when determining that the first processor has completed the first processor activation and the first video decoder has completed the first video decoder activation before the second processor completes the second processor activation.

5. The image signal processing apparatus according to claim 1 configured to be installed in a vehicle, wherein
the first processor detects a generation of the activation request and starts the activation when the first processor detects switching of an accessory power supply of the vehicle from off to on.

6. The image signal processing apparatus according to claim 1, wherein
an operation system and a control program loaded by the second processor when the second processor starts the activation are larger in data capacity than an operation system and a control program loaded by the first processor when the first processor starts the activation.

7. The image signal processing program product according to claim 4, wherein
the image signal processing apparatus is configured to be installed in a vehicle, and
the first processor detects a generation of the activation request and starts the activation when the first processor detects switching of an accessory power supply of the vehicle from off to on.

8. The image signal processing program product according to claim 4, wherein
an operation system and a control program loaded by the second processor when the second processor starts the activation are larger in data capacity than an operation system and a control program loaded by the first processor when the first processor starts the activation.

9. The image signal processing apparatus according to claim 1, wherein when the first processor completes the first processor activation, the first processor outputs a power-on command to a first power supply control circuit and a second power supply control circuit, and wherein when first power supply control circuit and the second power supply control circuit receive the power-on command, the first power supply control circuit supplies operating power to the first video decoder and the second video decoder and the second power supply control circuit supplies operating power to the second processor.

10. The image signal processing apparatus according to claim 9, wherein the operating power supplied by the first power supply control circuit has a preset operating voltage of 3.3 Volts and the operating power supplied by the second power supply control circuit has a preset operating voltage of 5 Volts.

11. The image signal processor apparatus according to claim 9, wherein the second processor starts the second processor activation upon receiving the operating power from the second power supply control circuit.

* * * * *